US010327180B2

(12) United States Patent
Drevon et al.

(10) Patent No.: US 10,327,180 B2
(45) Date of Patent: Jun. 18, 2019

(54) METHODS FOR SESSION TRANSFER BETWEEN ACCESS NETWORKS FOR A USER EQUIPMENT

(76) Inventors: Nicolas Drevon, Nozay (FR); Laurent Thiebaut, Nozay (FR)

( * ) Notice: Subject to any disclaimer, the term of this patent is extended or adjusted under 35 U.S.C. 154(b) by 12 days.

(21) Appl. No.: 13/322,289

(22) PCT Filed: May 25, 2010

(86) PCT No.: PCT/EP2010/057159
§ 371 (c)(1),
(2), (4) Date: Feb. 7, 2012

(87) PCT Pub. No.: WO2010/136452
PCT Pub. Date: Dec. 2, 2010

(65) Prior Publication Data
US 2012/0127926 A1 May 24, 2012

(30) Foreign Application Priority Data

May 26, 2009 (EP) .................................... 09290388

(51) Int. Cl.
H04W 8/26 (2009.01)
H04W 36/00 (2009.01)
(52) U.S. Cl.
CPC .......... *H04W 36/0022* (2013.01); *H04W 8/26* (2013.01)
(58) Field of Classification Search
CPC .............................. H04W 40/00; H04W 36/00
USPC ................................................. 370/310–350
See application file for complete search history.

(56) References Cited

U.S. PATENT DOCUMENTS

| 8,185,152 | B1* | 5/2012 | Goldner | H04W 48/18 370/282 |
| 8,218,459 | B1* | 7/2012 | Stucker | 370/261 |
| 2007/0149166 | A1 | 6/2007 | Turcotte et al. | |
| 2009/0191873 | A1* | 7/2009 | Siegel et al. | 455/435.2 |
| 2010/0124897 | A1* | 5/2010 | Edge | 455/404.1 |
| 2010/0246780 | A1* | 9/2010 | Bakker | H04L 65/40 379/38 |
| 2011/0058520 | A1* | 3/2011 | Keller et al. | 370/328 |
| 2011/0228707 | A1* | 9/2011 | Multikainen et al. | 370/259 |

FOREIGN PATENT DOCUMENTS

CN 101227733 A 7/2008

OTHER PUBLICATIONS

2nd Chinese Office Action dated Aug. 7, 2014, Application No. CN201080024896.7, 6 pgs.
Japanese Office Action dated Mar. 18, 2013, dated Apr. 2, 2013, JP Application No. 2012-512342, 3pgs.
Korean Office Action dated Jul. 30, 2013, KR Application No. 10-2011-7030692, 4 pgs.

(Continued)

Primary Examiner — Iqbal Zaidi
(74) Attorney, Agent, or Firm — Fay Sharpe LLP

(57) ABSTRACT

In an embodiment, there is provided a method for session transfer between Access Networks for a User Equipment UE, said method including insertion in a signaling path of a Service Continuity Application Server anchoring said session in IMS, said method including:
insertion of a Service Continuity Application Server V-SCC-AS located in a Visited PLMN V-PLMN for a UE roaming in said V-PLMN.

20 Claims, 4 Drawing Sheets

(56) References Cited

OTHER PUBLICATIONS $1^{st}$ Chinese Office Action dated Nov. 20, 2013, Application No. CN201080024896.7, 16 pgs.
$3^{rd}$ Generation Partnership Project; Technical Specification Group Services and System Aspects; SR VCC Support for IMS Emergency Calls (Release 9), 3GPP TR 23/870 V1.1.0, XP002552529, pp. 1-14, Apr. 14, 2009.
"Digital Cellular Telecommunications System (Phase 2+); Universal Mobile Telecommunications System (UMTS); IP Multimedia Subsystem (IMS); Stage 2 (3GPPS TS 23.228 version 8.4.0 Release 8)," ETSI TS 123 228 V8.4.0, vol. 3-Sa2, XP014041651, pp. 1-236, Apr. 1, 2008.
Nokia Siemens Networks et al., "SRVCC Functionality for Emergency Calls," 3GPP TSG-SA2 Meeting #73, S2-093438, Tallinn, Estonia, XP050346518, pp. 1-19, May 5, 2009.
"$3^{rd}$ Generation Partnership Project; Technical Specification Group Services and System Aspects; Signal Radio Voice Call Continuity (SRVCC); Stage 2 (Release 8)," 3GPP TS 23.216 V8.3.0, XP002552530, pp. 1-33, Mar. 16, 2009.
"$3^{rd}$ Generation Partnership Project; Technical Specification Group Services and Architecture; IP Multimedia Subsystem (IMS) Service Continuity; Stage 2 (Release 8)," 3GPP TS 23.237 V8.3.0, XP002552531, pp. 1-41, Mar. 16, 2009.
International Search Report for PCT/EP2010/057159 dated Feb. 3, 2011.

\* cited by examiner

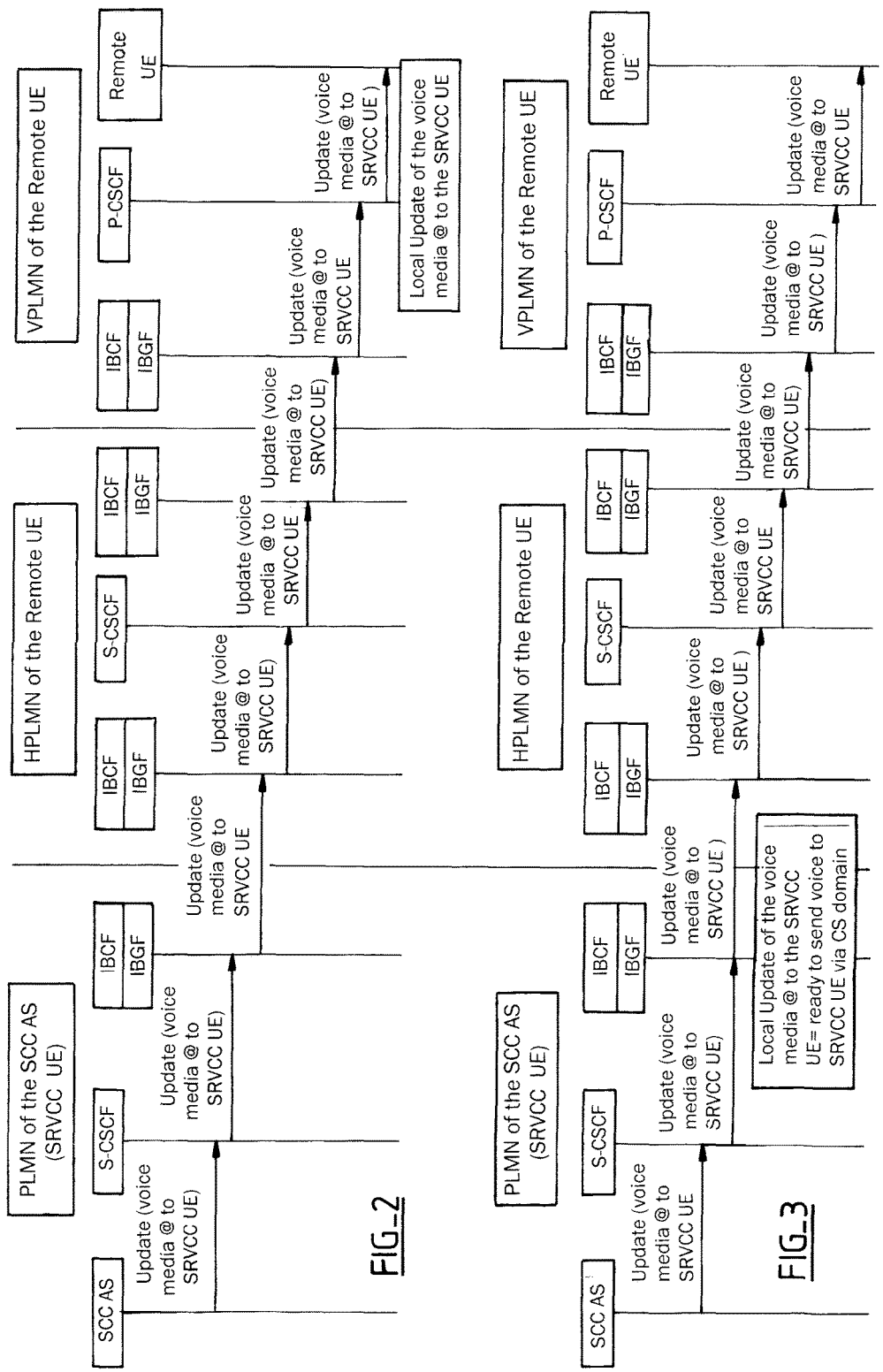

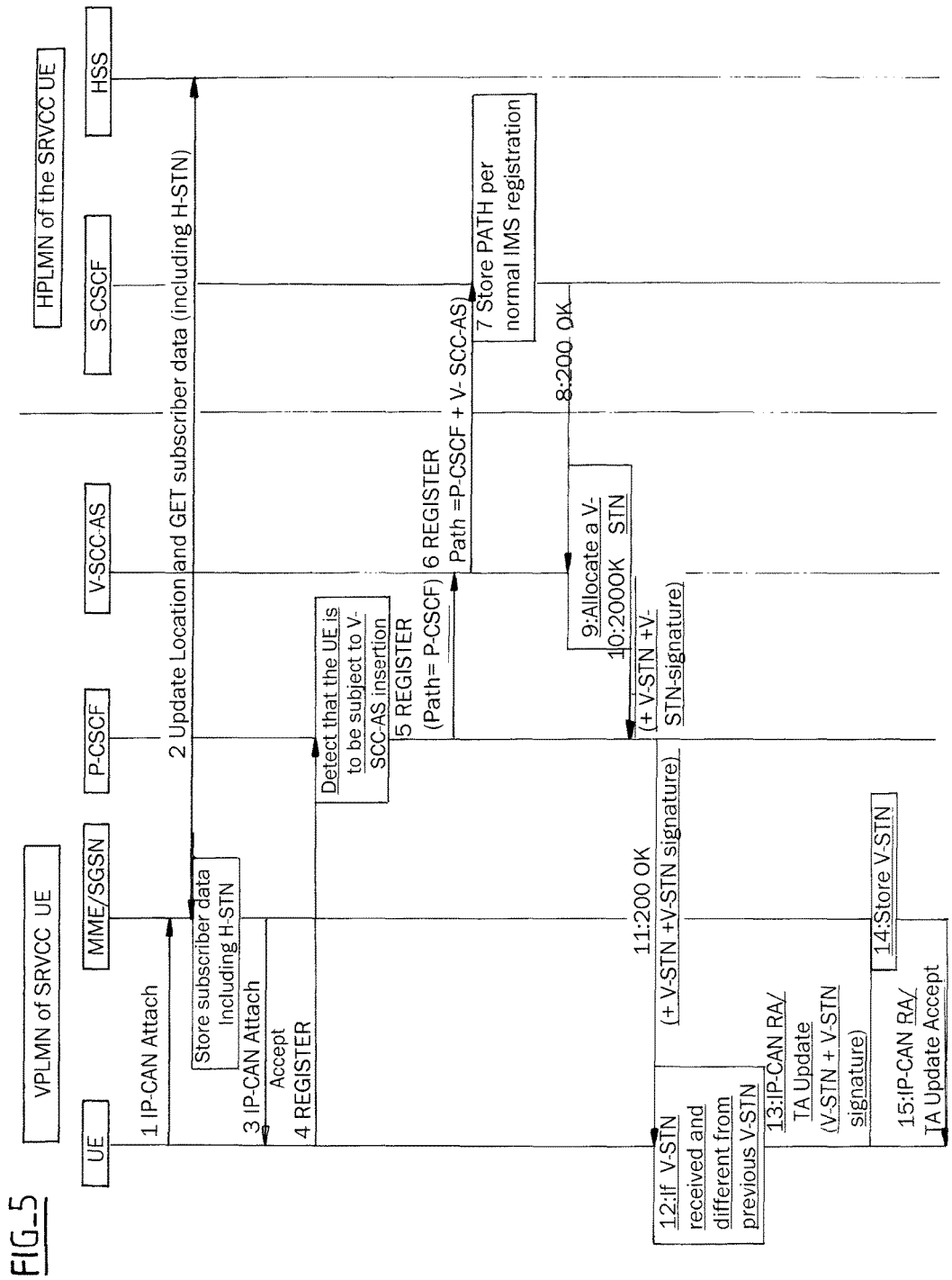
FIG_5

METHODS FOR SESSION TRANSFER BETWEEN ACCESS NETWORKS FOR A USER EQUIPMENT

CROSS-REFERENCE TO RELATED APPLICATIONS

This application is based on European Patent Application No. 09290388.9 filed May 26, 2009, the disclosure of which is hereby incorporated by reference thereto in its entirety, and the priority of which is hereby claimed under 35 U.S.C. § 119.

FIELD OF THE INVENTION

The present invention generally relates to mobile communication networks and systems.

BACKGROUND

Detailed descriptions of mobile communication networks and systems can be found in the literature, in particular in Technical Specifications published by standardisation bodies such as for example 3GPP (3$^{rd}$ Generation Partnership Project).
Single Radio Voice Call Continuity SRVCC is specified in particular in 3GPP TS 23.216 specification. SRVCC provides voice call continuity between IP Multimedia Subsystem IMS over Packet Switched PS access and Circuit Switched CS access for calls that are anchored in IMS when the User Equipment UE is capable of transmitting/receiving on only one of those access networks at a given time.
3GPP TS 23.216 specifies SRVCC between E-UTRAN access and 3GPP2's 1×CS, and between E-UTRAN access and 3GPP's UTRAN/GERAN accesses and between UTRAN (HSPA) access and 3GPP's UTRAN/GERAN accesses, for CS calls that are anchored in the IP Multimedia Subsystem IMS.
The VCC (or session transfer) part of SRVCC procedure is defined in particular in 3GPP TS 23.237 specifying IMS Service Continuity.

SUMMARY

Generally, there is a need to improve SRVCC or Service Continuity functionality. In particular, there is a need to reduce service interruptions during session transfer between Access Networks, as will be described with more detail later in the description. Such service interruptions are very badly perceived by end-users. There is a need to improve end user experience or quality of service as perceived by end-users.

These and other objects are achieved, in one aspect, in an embodiment, by a method for method for session transfer between Access Networks for a User Equipment UE, said method including insertion in a signaling path of a Service Continuity Application Server anchoring said session in IMS, said method including:
   insertion of a Service Continuity Application Server V-SCC-AS located in a Visited PLMN V-PLMN for a UE roaming in said V-PLMN.

These and other objects are achieved, in another aspect, in an embodiment, by a method for session transfer between Access Networks for a User equipment UE, said method including insertion in a signaling path of a Service Continuity Application Server SCC-AS anchoring said session in IMS, and updating addressing information Cora bearer path, said method comprising the steps of:

updating the first inter-PLMN interworking entity in the path from SCC-AS to a remote end, with updated addressing information,
interworking, in said inter-PLMN interworking entity, non-updated addressing information used on the bearer path from said inter-PLMN interworking entity towards said remote end, with updated addressing information to be used on the bearer path from said inter-PLMN interworking entity towards said UE.

These and other objects are achieved, in other aspects and embodiments of the present invention, by entities configured for carrying out such methods, said entities including entities such as, in particular: User Equipment UE, Service Continuity Application Server SCC-AS, and network entities in turn including IMS Core Network entities such as in particular P-CSCF, Packet Core Network entities such as in particular Mobility Management Entity MME within Evolved Packet Core EPC or SGSN within GPRS Packet Core, inter-PLMN interworking entities such as in particular IBCF/IBGF.

BRIEF DESCRIPTION OF THE DRAWINGS

Some embodiments of apparatus and/or methods in accordance with embodiments of the present invention are now described, by way of example only, and with reference to the accompanying drawings, in which:
FIG. 2 illustrates a possible solution for updating of addressing information for the bearer path, having some drawbacks that embodiments such as for example the one illustrated in FIG. 3 enables to avoid,
FIG. 3 illustrates an embodiment for updating of addressing information for the bearer path,
FIG. 5 illustrates an embodiment for Attach and IMS Register in a VPLMN that supports V-SCC-AS.

DESCRIPTION OF EMBODIMENTS

Figure 1:
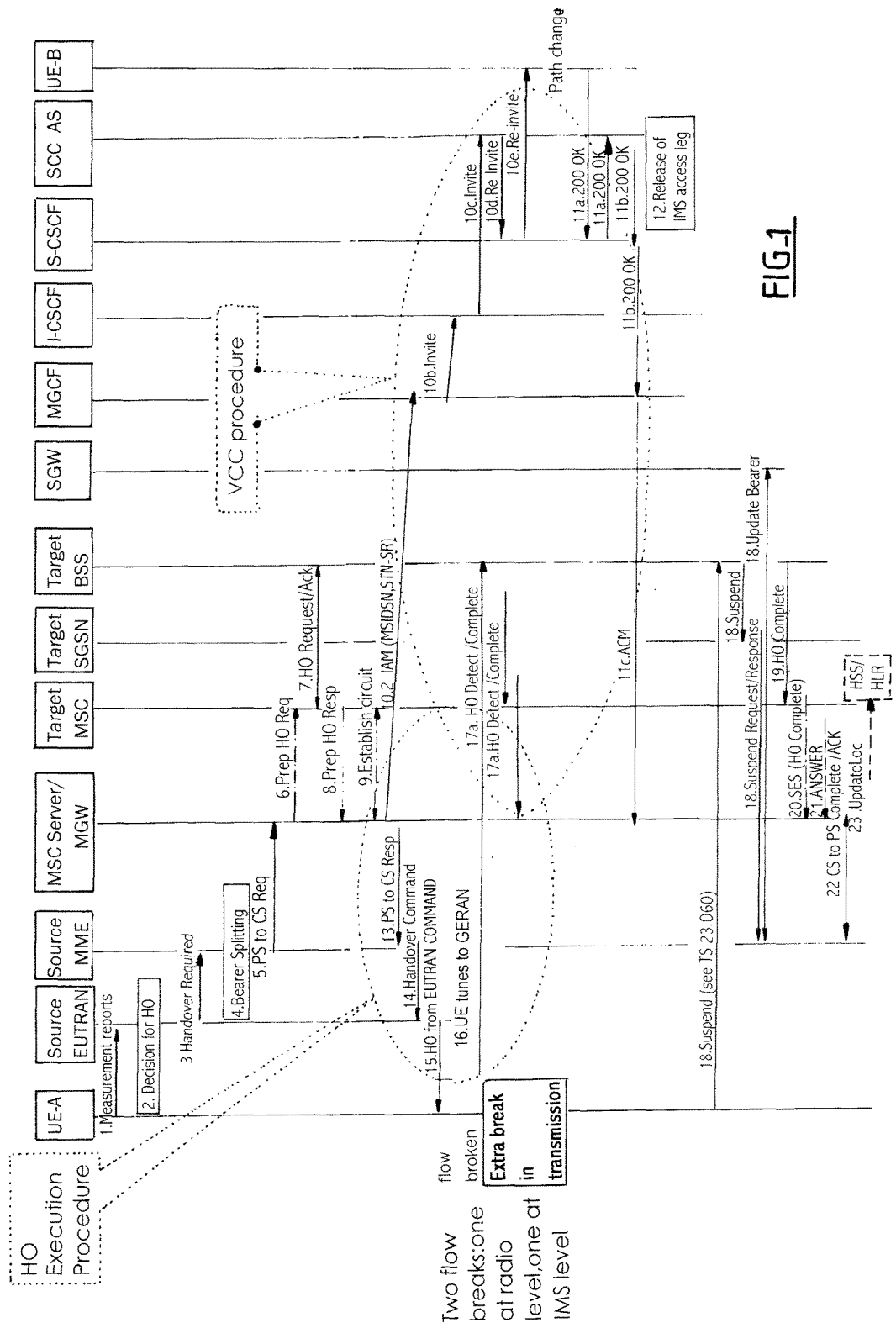
FIG. 1 provides an overview of SRVCC procedure such as for example SRVCC from E-UTRAN to GERAN procedure.

FIG. 1 provides an overview of SRVCC procedure such as for example SRVCC from E-UTRAN to GERAN procedure.
Elements illustrated in FIG. 1 include in particular the following elements:
   UE-A (also referred to hereinafter as UE): SRVCC capable User Equipment UE,
   Source MME: SRVCC capable Mobility Management Entity MME (within Evolved Packet Core EPC),
   MSC Server/MGW: Mobile Switching Center Server/ Media Gateway, where MSC Server corresponds to MSC Server enhanced for SRVCC, in particular MSC Server invoking the Session Transfer procedure, and coordinating the HO procedure and the Session Transfer procedure,
   Target MSC: MSC controlling the Target BSS (if the MSC Server controls the Target BSS, the functions of the MSC Server are merged with those of the target MSC),
   Target BSS: Target GERAN Base Station Subsystem,
   MGCF: IMS entity corresponding to Media Gateway Control Function,
   I-CSCF: IMS entity corresponding to Interrogating-Call Session Control Function,
   S-CSCF: IMS entity corresponding to Serving-Call Session Control Function, SCC AS: IMS entity corresponding to Service Centralization and Continuity, Application Server, UE-B: remote terminal.

SRVCC procedure as illustrated in FIG. 2 generally includes Hand-Over HO execution procedure, and VCC or Session Transfer procedure.

VCC or session transfer procedure) as illustrated in FIG. 1 includes the following steps:

10a: MSC Server enhanced for SRVCC sends ISUP Initial Address IAM (MSISDN, STN-SR) message to Media Gateway Control Function MGCF, where STN-SR corresponds to Session Transfer Number for SRVCC, as specified in particular in 3GPP TS 23.237, 10b: MGCF sends SIP Invite message to I-CSCF 10c: I-CSCF sends SIP Invite message to SCC AS 10d: SCC AS sends SIP Re-Invite message to S-CSCF 10e: S-CSCF sends SIP Re-Invite message to UE-B 11a: UE-B sends SIP 200 OK message to SCC AS via S-CSCF 11b: SCC AS sends SIP 200 OK message to MGCF via S-CSCF 11c: MGCF sends ISUP Address Complete ACM message to MSC Server enhanced for SRVCC.

As mentioned above, there is a need to improve SRVCC or Service Continuity functionality. In particular, there is a need to reduce service interruptions during session transfer between Access Networks.

Embodiments of the present invention that will be described hereinafter are based in particular on the following ideas.

Having an as short as possible interruption gap at SRVCC is key for the success of the roll-out of Voice over IMS and especially the VCC part of the SRVCC procedure is the critical part to be optimized.

One requirement is to take into account both roaming and non-roaming case. In roaming cases, with the Rel-8 SRVCC specifications, SCC AS is located in the Home HPLMN which may result in longer signalling delay for the execution of Session Transfer.

In one aspect, it is recognized that locating some SCC AS functions in the Visited PLMN VPLMN would avoid such additional delay to. In another aspect, it is recognized that during a SRVCC procedure there is no need to actually wait for the session update to be sent to the remote terminal itself: the first IBCF/IBGF in the path from the SCC AS towards the remote user may process locally the session update by changing the IP addressing (IP address, UDP port) to be used to send the voice media towards the SRVCC user. In particular, this will save the inter-PLMN part of signalling delays which may experience significant variations depending on the network architecture.

It is important to
1. understand the improvements brought by locating some SCC AS functions in the VPLMN;
2. understand how to locate some SCC AS functions in the VPLMN, while leveraging on the existing SRVCC procedure, i.e. providing a minimum set of modifications to already deployed SRVCC solutions while ensuring backward compatibility;
   a. especially, the other functions of the SCC AS (Inter UE Transfer, IMS Centralised Service, . . . ) shall not be modified and shall still be invoked in the Home PLMN.

Improvements Brought by Locating Some V-SCC AS Functions in the VPLMN

The Session Transfer part of the SRVCC procedure is made up of 2 sub-parts:
1. A call from the MSC server enhanced for SRVCC to a SCC AS (call o MSC server enhanced for SRVCC targeting the STN)
2. A session update from the SCC AS towards the remote party to notify that the IP addressing for the voice media of the SRVCC user has changed.

As mentioned above, there is no need to actually wait for the session update to be sent to the remote terminal itself: the first IBCF/IBGF in the path from the SCC AS towards the remote user may process locally the session update by changing the IP addressing (IP address, UDP port) to be used to send the voice media towards the SRVCC user. This will save the inter-PLMN part of signalling delays which may experience significant variations depending on the network architecture.

Based on this assumption, only the first sub-part of the Session Transfer procedure (call from the MSC sever to a SCC AS) needs to be optimized. This call (from the MSC server to a SCC AS) may take a duration that may differ depending on whether the user is roaming or not, i.e. depending on the SCC AS location. Especially when the user is roaming, the call from the MSC server to a SCC AS may take a fairly long time as the signalling flow has to cross many nodes including nodes at the border between Visited and Home PLMN.

FIG. 2 illustrates a possible solution for updating of addressing information, having some drawbacks that embodiments of the present invention, such as for example the embodiment illustrated in FIG. 3, enable to avoid.

In FIGS. 2 and 3 the following PLMNs are illustrated: PLMN of the SCC-AS, Home PLMN (HPLMN) of the Remote UE, Visited PLMN (VPLMN) of the Remote UE. Signalling exchanged for said updating of addressing information include, in FIGS. 2 and 3, update messages (such as the message noted "update voice media address to SRVCC UE") exchanged:

in PLMN of SCC-AS:
    Between SCC-AS and S-CSCF
    Between S-CSCF and IBCF/IBGF
    between IBCF/IBGF in PLMN of SCC-AS and first IBCF/IBGF in HPLMN of Remote UE
in HPLMN of the Remote UE:
    Between first IBCF/IBGF and S-CSCF
    Between S-CSCF and second IBCF/IBGF
    between second IBCF/IBGF in HPLMN of Remote UE and IBCF/IBGF in VPLMN of Remote UE
in VPLMN of the Remote UE:
    Between IBCF/IBGF and P-CSCF
    Between P-CSCF and UE.

In FIG. 2, when the Remote UE receives this message, it performs locally the addressing update.

In FIG. 3, when the IBCF/IBGF in the PLMN of SCC-AS receives this message, it performs locally the addressing update (or media switching), it is then ready to send voice to SRVCC UE via CS domain. In other words, the addressing update is done in the first IBCF in the path from SCC-AS to Remote UE. Therefore the addressing update is made much quicker. As indicated above, locating the subset of SCC AS functions that handle the SRVCC procedure (from native IMS to CS domain) decreases the duration of this SRVCC procedure.

How to Locate Some SCC AS Functions in the VPLMN

The call setup from a MSC server to a SCC AS within a SRVCC procedure fulfills following principles (refer to 3GPP TS 23.216) for both E-UTRAN to UTRAN/GERAN and UTRAN to UTRAN/GERAN cases:

1. SRVCC relies on the E164 number (STN) to be called to invoke SRVCC to CS domain to be stored on the HSS of the user (actually routing towards this E164/STN value targets the SCC AS for SRVCC allocated to this user);
2. The HSS passes the STN allocated to an user to the MME/SGSN upon Mobility Management procedure (at Attach or mobility to a new MME/SGSN);
3. The MME/SGSN passes this information to the MSC server enhanced for SRVCC over Sv when it invokes a SRVCC handover procedure
4. The MSC server enhanced for SRVCC calls the STN whose value has been received from the MME/SGSN that has invoked the SRVCC handover procedure.

Inserting a V-SCC AS dedicated to SRVCC and located in the VPLMN shall respect these principles recalled above. Inserting a V-SCC AS dedicated to SRVCC is thus enforced as follows:

1. The solution described below assumes that a P-CSCF in the current VPLMN is being chosen. If the P-CSCF being used is not in the VPLMN or if the VPLMN does not support the procedure described here after, the SRVCC works as per (existing) 3GPP Rel8/Rel9 procedures;
2. The V-SCC-AS is a SCC AS located in VPLMN and exclusively deals with SRVCC procedures to provide mobility from native IMS to CS domain. The other functions of the SCC AS (Inter UE Transfer, IMS Centralised Service, . . . ) are not be handled by the V-SCC-AS. Adding a V-SCC-AS does not prevent the HPLMN from adding a SCC AS (in HPLMN) per the mechanisms described in 3GPP TS 23.237 and 3GPP TS 23.292; Note: the actual location (separate node, co-located with another function) of the V-SCC-AS is a matter of implementation choice.
3. At EPS/PS attach the STN associated with the SCC AS in HPLMN is passed from HSS/HLR to the MME/SGSN per Rel8 3GPP TS 23.216 procedure. The STN associated with the SCC AS in HPLMN is called later H-STN;
4. A P-CSCF supporting the V-SCC-AS insertion, determines (at UE REGISTER) that an UE is to be subject to V-SCC-AS insertion when following conditions are met:
   this P-CSCF is handling a mobile SRVCC capable UE, and
   roaming conditions are detected by a P-CSCF, and
   local VPLMN policies (e.g. the VPLMN is willing to support V-SCC-AS insertion) are satisfied;
5. When an UE is subject V-SCC-AS insertion, the P-CSCF adds a V-SCC-AS in the Route of IMS REGISTER issued by this UE.
   Upon reception of such REGISTER, the V-SCC-AS adds itself in the Path (as per IETF RFC 3327) sent to the S-CSCF. This ensures that the V-SCC-AS is able to process all IMS signalling targeting the UE;
   Upon reception of an indication of a successful REGISTER (200 OK), the V-SCC-AS allocates a V-STN value for the user and provides it to the MME/SGSN. The V-STN value supersedes the value (H-STN) received from HSS;
   The STN associated with the SCC AS in VPLMN is called later V-STN. The way to provide the V-STN value to the MME/SGSN is described in the next section;
6. When an UE is subject V-SCC-AS insertion, the P-CSCF adds the same V-SCC-AS in the Route of IMS sessions for MMTEL service initiated by this UE. Thus the V-SCC-AS is able to process all signalling for sessions initiated by the UE for MMTEL service. Note: Adding the V-SCC-AS in the Service-Route (i.e. at REGISTER response) is not possible as an intermediate proxy is not allowed per IETF RFC 3608 to alter the Service-Route: "intermediate proxies SHOULD NOT alter the value of Service-Route in REGISTER responses, and if they do, the UA MUST NOT be required to accept the alteration".
7. There is no specific process needed to include the V-SCC-AS within the path of an incoming dialog as the S-CSCF routes them according to the Path header that contains the identity of the V-SCC-AS. The V-SCC-AS acts per SCC AS behaviour only if the incoming dialog corresponds to an incoming INVITE for a MMTEL based session.
8. When processing (a dialog for) a Voice call, the V-SCC-AS acts as a B2BUA (Back-to-back User Agent) per 3GPP TS 23.237 procedures. This does not preclude a SCC AS from being inserted in the Home PLMN;
9. The SRVCC procedure works exactly as defined in 3GPP TS 23.216, with the only difference that the STN value passed from MME/SGSN to the MSC server enhanced for SRVCC is the V-STN value rather than the H-STN value and that thus the V-SCC-AS rather than the H-SCC-AS is invoked.

Figure 4:
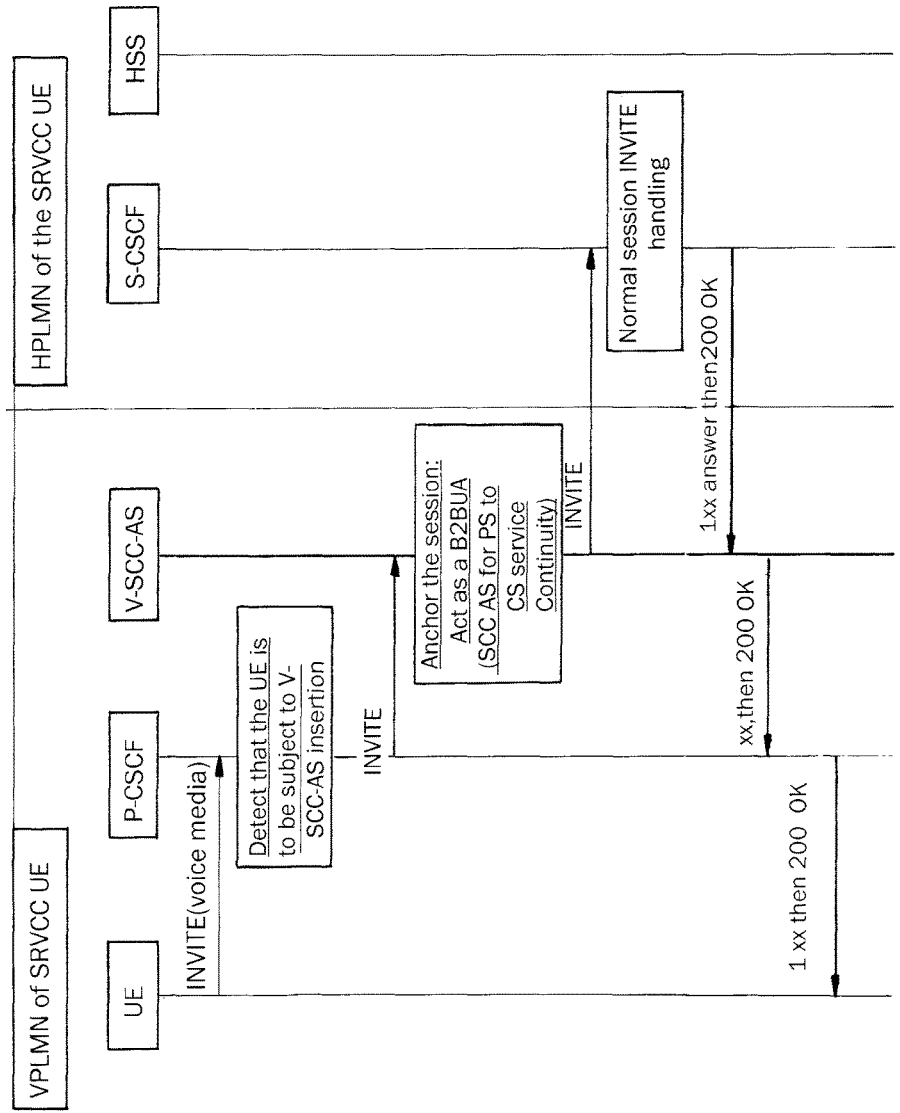
FIG. 4 illustrates on embodiment for insertion of a V-SCC-AS at Outgoing Session

FIG. 4 Illustrates on Embodiment for Insertion of a V-SCC-AS at Outgoing Session.

The following elements are illustrated in FIG. 4:

in VPLMN of SRVCC-UE: UE, P-CSCF, VCC-AS in HPLMN of SRVCC-UE: S-CSCF, HSS.

The following steps are illustrated in FIG. 4:

UE sends INVITE to P-CSCF

P-CSCF detects that the UE is subject to V-SCC-AS insertion

P-CSCF forwards INVITE to V-SCC-AS

V-SCC-AS anchors the session: acts as a B2BUA (Back to Back User Agent) (SCC AS for PS to CS Service Continuity)

V-SCC-AS forwards INVITE to S-CSCF

Normal session INVITE handling by S-CSCF

S-CSCF sending 1xx Answer then 200 OK to V-SCC-AS

V-SCC-AS forwarding 1xx Answer then 200 OK to P-CSCF

P-CSCF forwarding 1xx Answer then 200 OK to UE.

How to Provide the V-STN to the MME/SGSN

Following solutions may be envisaged:

1. Passing the information via the UE. This solution works as follows:
   1. the V-STN value is provided to the UE via the P-CSCF together with the a result of a successful IMS registration. The way to provide the information is left for stage 3 discussions but as an example a dedicated P-header may be used.

The V-STN is provided to the UE together with a signature calculated using
  i. a key shared between the V-SCC-AS and the MME/SGSN (both being controlled by the VPLMN operator),
  ii. Some anti-replay value,
  iii. The V-STN itself;
2. When the UE detects a positive (200 OK) answer to a REGISTER contains a V-STN value, it issues a TA update/RA update to the MME/SGSN together with the couple (V-STN, V-STN signature). The signature is used by the MME/SGSN to ensure that the UE is sending proper information.

The advantage of this solution is that it does not require an extra network interface. The drawback is that it requires the participation of the UE and thus requires 3GPP Rel10 UE(s) in order that SRVCC enhancements are effective for the UE. However, this solution allows UEs compliant to 3GPP Rel8/Rel9 to inter-work as per 3GPP Rel8/Rel9 SRVCC behavior with an updated network supporting those SRVCC enhancements.

FIG. 5 illustrates an embodiment for Attach and IMS Register in a VPLMN that supports V-SCC-AS. The following steps are illustrated in FIG. 5:
1. IP-CAN Attach per Rel8/9 procedure (refer to 3GPP TS 23.401/3GPP TS 23.060). The only modification is that if the UE has a valid V-STN (The IP-CAN attach is for Hand-Over purpose and the UE is IMS Registered and has received a V-STN as part of this registration), the UE provides the (V-STN, V-STN-signature) within the IP-CAN Attach. In that case the SGSN/MME stores the V-STN in the UE context. Note: The rest of the call flow assumes that the Attach is not for Hand-Over purpose and that the UE is NOT IMS Registered (and thus has not got a V-STN).
2. As part of the IP-CAN attach, the MME/SGSN gets from the HSS/HLR the subscription data of the UE. If a H-STN is received as part of this step, it is stored and will be used as STN as long as a valid V-STN has not been received from the UE;
3. End of the IP-CAN Attach procedure per Rel8/9 procedure (refer to 3GPP TS 23.401/3GPP TS 23.060).
   Note: the intermediate steps of the IP-CAN Attach procedure are not shown in the figure.
4. IMS REGISTER per Rel8/9 3GPP TS 24.229.
5. When it has detected that the UE is to be subject to V-SCC-AS insertion, the P-CSCF allocates a V-SCC-AS and Routes the REGISTER request via this V-SCC-AS. As part of this procedure, the P-CSCF puts its identity in the Path Header (per Rel8/9 3GPP TS 24.229).
6. The V-SCC-AS puts its identity in the Path Header, in order to be in the path of incoming sessions targeting the UE;
7. The S-CSCF executes the IMS registration procedure per Rel8/9 3GPP TS 24.229;
8. The S-CSCF answers positively to the IMS REGISTER request;
9. Upon detection of a positive answer to the IMS REGISTER request, the V-SCC-AS allocates a V-STN and calculates its V-STN-signature;
10. The V-STN and its V-STN-signature are passed as part the positive answer to the IMS REGISTER sent from V-SCC-AS to the P-CSCF;
11. The V-STN and its V-STN-signature are passed as part the positive answer to the IMS REGISTER sent from P-CSCF to the UE;
12. If the V-STN has been received within the positive answer to the IMS REGISTER and is different from previously stored V-STN, the UE stores the V-STN and its V-STN-signature and issues an IP-CAN RA/TA Update;
13. IP-CAN RA/TA Update with the V-STN and its V-STN-signature;
14. If the V-STN-signature is correct, the MME/SGSN stores the V-STN. This value will be used (to transmit it to the MSC server over Sv) instead of any previously stored V-STN and H-STN as part of a SRVCC procedure;

IP-CAN RA/TA Update Accept per Rel8/9 procedure (refer to 3GPP TS 23.401/3GPP TS 23.060).

2. Usage S6a/S6d insert Subscriber Data towards the MME/SGSN. This solution works as follows:
1. The V-SCC-AS issues an S6a/S6d Insert Subscriber Data towards the MME/SGSN to provide it with the V-STN value.
   This solution works for E-UTRAN to UTRAN/GERAN SRVCC handovers, but would only work for UTRAN to UTRAN/GERAN SRVCC handovers with SGSN that support S6d. If the SGSN does not support S6d, then SRVCC from 3G to 2G applies per REl8/REL9 i.e. usage of the SCC AS in HPLMN;
   In order to cope with cases where the HPLMN would also issue S6a/S6d Insert Subscriber Data towards the MME/SGSN to provide it with a new H-STN value, it could be studied whether the MME/SGSN manages 2 STN values=a V-STN and a H-STN one. In that case, when the MME/SGSN has got a V-STN value, the V-STN value would have precedence over the H-STN value. This would be the only modification required from MME/SGSN to support SCC AS for SRVCC in VPLMN.
2. The V-SCC-AS thus needs to be in the signalling path between the MME/SGSN and the HSS/HLR:
   a) The V-SCC-AS needs to act as a S6a/S6d Diameter Relay between the MME/SGSN of the VPLMN and the HSS/HLR belonging to other PLMN(s);
   b) Upon S6a/S6d Update Location Request issued by MME/SGSN towards the HSS/HLR, the V-SCC-AS stores the association between the IMSI of the user and the Diameter address of the MME/SGSN that serves the UE;
   c) When it processes the IMS REGISTER from the UE, the V-SCC-AS retrieves the IMPI of the user. Assuming the IMPI is made up based on the IMSI, the V-SCC-AS may determine the Diameter address of the MME/SGSN based on the (IMSI, Diameter address of the MME/SGSN) local table built in the step b)above.

The advantage of this solution is that it does not require Rel10 UE(s). The drawbacks are that it makes the routing of S6a/S6d messages more complex, that it requires S6d capable SGSN and that it requires a mapping between the IMPI and the IMSI.

In one aspect, in an embodiment, there is provided a method for session transfer between Access Networks for a User Equipment UE, said method including insertion in a signaling path of a Service Continuity Application Server anchoring said session in IMS, said method including:

insertion of a Service Continuity Application Server V-SCC-AS located in a Visited PLMN V-PLMN for a UE roaming in said V-PLMN.

In an embodiment, said session transfer corresponds to the Voice Call Continuity VCC part of a Single Radio Voice Call Continuity SRVCC procedure.

In an embodiment, said method comprises a step of:
a P-CSCF supporting V-SCC-AS insertion and determining, at IMS REGISTER, if an UE is subject to V-SCC-AS insertion.

In an embodiment, said method comprises a step of:
a P-CSCF supporting V-SCC-AS insertion and determining, at IMS REGISTER, that an UE is subject to V-SCC-AS insertion when following conditions are met:
  said P-CSCF is handling a mobile SRVCC capable UE,
  roaming conditions are detected by said P-CSCF,
  local VPLMN policies for support of V-SCC-AS are satisfied.

In an embodiment, said method comprises a step of:
upon detecting that an UE is subject to V-SCC-AS insertion, said P-CSCF adding a V-SCC-AS in the Route of IMS REGISTER issued by said UE.

In an embodiment, said method comprises a step of:
upon reception of said IMS REGISTER, the V-SCC-AS adding itself in the Path sent to the S-CSCF, ensuring that the V-SCC-AS is able to process all IMS signalling targeting the UE.

In an embodiment, said method comprises a step of:
upon detection of a positive answer to an IMS REGISTER request, the V-SCC-AS allocating a Visited-Session Transfer Number V-STN value.

In an embodiment, said method comprises a step of:
V-SCC-AS allocating a V-STN value and calculating its V-STN signature.

In an embodiment, said method comprises a step of:
computing a V-STN signature using
  i. security material shared between the V-SCC-AS and the MME/SGSN,
  ii. Some anti-replay value
  iii. The V-STN itself In an embodiment, said method comprises a step of:
V-SCC-AS passing the V-STN as part of a positive answer to the IMS REGISTER to the P-CSCF.

In an embodiment, said method comprises a step of:
V-SCC AS passing the V-STN and its V-STN signature.

In an embodiment, said method comprises a step of:
P-SCSCF passing the V-STN as part of a positive answer to the IMS REGISTER to the UE.

In an embodiment, said method comprises a step of:
P-SCSF passing the V-STN and its V-STN signature.

In an embodiment, said method comprises a step of:
upon receiving a V-STN within a positive answer to an IMS REGISTER, which is different from previously stored V-STN, the UE storing the received V-STN, and issuing an IP-CAN RA/TA Update with the V-STN to a MME/SGSN.

In an embodiment, said method comprises a step of:
upon receiving a V-STN within a positive answer to an IMS REGISTER, which is different from previously stored V-STN, the UE storing the received V-STN, and issuing an IP-CAN RA/TA Update with the V-STN to a MME/SGSN if satisfying HPLMN operator policies.

In an embodiment, said method comprises a step of:
the UE storing the V-STN and its V-STN signature and issuing an IP-CAN RA/TA Update with the V-STN and its V-STN signature to a MME/SGSN.

In an embodiment, said method comprises a step of:
the UE storing the V-STN and its V-STN signature and issuing an IP-CAN RA/TA Update with the V-STN and its V-STN signature to a MME/SGSN if satisfying HPLMN operator policies.

In an embodiment, said method comprises a step of:
upon receiving an IP-CAN RA/TA Update Request with a V-STN, an MME/SGSN storing the V-STN, and later on, i.e. at SRVCC invocation, using this value for transmission to a MSC server over Sv interface, instead of any previously stored V-STN and H-STN as part of a SRVCC procedure.

In an embodiment, said method comprises a step of:
upon receiving an IP-CAN RA/TA Update Request with a V-STN and its V-STN signature, the MME/SGSN if the V-STN signature is correct, storing the V-STN, and later on, i.e. at SRVCC invocation, using this value for transmission to a MSC server over Sv interface, instead of any previously stored V-STN and H-STN as part of a SRVCC procedure.

In an embodiment, said method comprises a step of:
upon receiving an IP-CAN RA/TA Update Request with a V-STN and its V-STN signature, the MME/SGSN if the V-STN signature is incorrect, sending an alarm to the Operation Administration and Maintenance of the VPLMN.

In an embodiment, said method comprises a step of:
providing a Visited-Session Transfer Number V-STN value by V-SCC-AS to a MME/SGSN using S6a/S6d Insert Subscriber Data towards the MME/SGSN.

In an embodiment, said method comprises a step of:
a P-CSCF supporting V-SCC-AS insertion determining, upon reception of an INVITE issued by an UE for IMS Session establishment, if said UE is subject to V-SCC-AS insertion,
upon detecting that the UE is subject to V-SCC-AS insertion, said P-CSCF forwarding said INVITE to V-SCC-AS.

In an embodiment, said method comprises a step of:
upon reception of an INVITE for session establishment from a P-CSCF, V-SCC-AS anchoring the session.

In another aspect, in an embodiment, there is provided a method for session transfer between Access Networks for a User equipment UE, said method including insertion in a signaling path of a Service Continuity Application Server SCC-AS anchoring said session in IMS, and updating of addressing information for a bearer path, said method comprising the steps of:
  updating the first inter-PLMN interworking entity in a path from SCC-AS to a remote end, with updated addressing information,
  interworking, in said inter-PLMN interworking entity, non-updated addressing information used on the bearer path from said inter-PLMN interworking entity towards said remote end, with updated addressing information to be used on the bearer path from said inter-PLMN interworking entity towards said UE.

In an embodiment, said session transfer corresponds to the Voice Call Continuity VCC part of a Single Radio Voice Call Continuity SRVCC procedure.

In an embodiment, said method comprises a step of:
insertion of a Service Continuity Application Server V-SCC-AS located in a Visited PLMN V-PLMN for a UE roaming in said V-PLMN In other aspects, entities are provided configured for carrying out such methods, said entities including entities such as, in particular: User Equipment UE, Service Continuity Application Server SCC-AS, and network entities in turn including IMS Core Network entities such as in particular P-CSCF, Packet Core Network entities such as in particular Mobility Management Entity MME within Evolved Packet Core EPC or SGSN within GPRS Packet Core, inter-PLMN interworking entities such as in particular IBCF/IBGF.

In an embodiment, there is provided a P-CSCF supporting V-SCC-AS insertion and configured:
  for determining, at IMS REGISTER, if an User Equipment UE is subject to V-SCC-AS insertion.

In an embodiment, there is provided a P-CSCF supporting V-SCC-AS insertion and configured:
  for determining, at IMS REGISTER, that an UE is subject to V-SCC-AS insertion when following conditions are met:
    said P-CSCF is handling a mobile SRVCC capable UE,
    roaming conditions are detected by said P-CSCF,
    local VPLMN policies for support of V-SCC-AS are satisfied.

In an embodiment, there is provided a P-CSCF supporting V-SCC-AS insertion and configured:
  for, upon detecting that an UE is subject to V-SCC-AS insertion, adding a V-SCC-AS in the Route of IMS REGISTER issued by an User Equipment UE.

In an embodiment, there is provided a P-CSCF supporting V-SCC-AS insertion and configured:
  for passing a Visited-Session Transfer Number V-STN as part of a positive answer to an IMS REGISTER to an User Equipment UE.

In an embodiment, there is provided a P-CSCF supporting V-SCC-AS insertion and configured:
  for passing a Visited-Session Transfer Number V-STN and its V-STN signature.

In an embodiment, there is provided a P-CSCF supporting V-SCC-AS insertion and configured:
  for determining, upon reception of an INVITE issued by an UE for IMS Session establishment, if said UE is subject to V-SCC-AS insertion,
  for, upon detecting that the UE is subject to V-SCC-AS insertion, forwarding said INVITE to V-SCC-AS.

In an embodiment, there is provided a Service Continuity Application Server V-SCC-AS configured:
  for, upon reception of an IMS REGISTER, adding itself in the Path sent to S-CSCF, ensuring that the V-SCC-AS is able to process all IMS signalling targeting User equipment UE.

In an embodiment, there is provided a Service Continuity Application Server V-SCC-AS configured:
  for, upon detection of a positive answer to an IMS REGISTER request, allocating a Visited-Session Transfer Number V-STN value.

In an embodiment, there is provided a Service Continuity Application Server V-SCC-AS configured:
  for allocating a Visited-Session Transfer Number V-STN value and computing its V-STN signature.

In an embodiment, there is provided a Service Continuity Application Server V-SCC-AS configured:
  for computing a V-STN signature using
    iv. security material shared between the V-SCC-AS and the MME/SGSN,
    v. Some anti-replay value
    vi. The V-STN itself In an embodiment, there is provided a Service Continuity Application Server V-SCC-AS configured:
  for passing a Visited-Session Transfer Number V-STN as part of a positive answer to an IMS REGISTER to P-CSCF.

In an embodiment, there is provided a Service Continuity Application Server V-SCC-AS configured:
  for passing a Visited-Session Transfer Number V-STN and its V-STN signature.

In an embodiment, there is provided a Service Continuity Application Server V-SCC-AS configured:
  for providing a Visited-Session Transfer Number V-STN value to a MME/SGSN using S6a/S6d Insert Subscriber Data towards the MME/SGSN.

In an embodiment, there is provided a Service Continuity Application Server V-SCC-AS configured:
  for, upon reception of an INVITE for session establishment from a P-CSCF, anchoring the session.

In an embodiment, there is provided a User Equipment UE configured:
  for, upon receiving a Visited-Session Transfer Number V-STN within a positive answer to an IMS REGISTER, which is different from previously stored V-STN, storing the received V-STN, and issuing an IP-CAN RA/TA Update with the V-STN to a MME/SGSN.

In an embodiment, there is provided a User Equipment UE configured:
  for, upon receiving a V-STN within a positive answer to an IMS REGISTER, which is different from previously stored V-STN, storing the received V-STN, and issuing an IP-CAN RA/TA Update with the V-STN to a MME/SGSN if satisfying HPLMN operator policies.

In an embodiment, there is provided a User Equipment UE configured:
  for storing the V-STN and its V-STN signature, and issuing an IP-CAN RA/TA Update with the V-STN and its V-STN signature to a MME/SGSN.

In an embodiment, there is provided a User Equipment UE configured:
  for storing the V-STN and its V-STN signature and issuing an IP-CAN RA/TA Update with the V-STN and its V-STN signature to a MME/SGSN if satisfying HPLMN operator policies.

In an embodiment, there is provided a Mobility Management Entity MME/Serving GPRS Support Node SGSN configured:
  for, upon receiving an IP-CAN RA/TA Update Request with a V-STN, storing the V-STN, and later on, i.e. at SRVCC invocation, using this value for transmission to a MSC server over Sv interface, instead of any previously stored V-STN and H-STN as part of a SRVCC procedure.

In an embodiment, there is provided a Mobility Management Entity MME/Serving GPRS Support Node SGSN configured:
  for, upon receiving an IP-CAN RA/TA Update Request with a V-STN and its V-STN signature, if the V-STN signature is correct, storing the V-STN, and later on, i.e. at SRVCC invocation, using this value for transmission to a MSC server over Sv interface, instead of any previously stored V-STN and H-STN as part of a SRVCC procedure.

In an embodiment, there is provided a Mobility Management Entity MME/Serving GPRS Support Node SGSN configured:
  for, upon receiving an IP-CAN RA/TA Update Request with a V-STN and its V-STN signature, if the V-STN signature is incorrect, sending an alarm to the Operation Administration and Maintenance of the VPLMN.

In an embodiment, there is provided an inter-PLMN interworking entity, such as IBCF/IBGF, said inter-PLMN interworking entity corresponding to the first inter-PLMN interworking entity in a path from a Service Continuity Application Server SCC-AS anchoring a session in IMS for a User Equipment UE, to a remote end of the session, and said inter-PLMN interworking entity configured:

for updating said inter-PLMN interworking entity with updated addressing information for a bearer path, at session transfer, for interworking non-updated addressing information used on the bearer path from said inter-PLMN interworking entity towards said remote end, with updated addressing information to be used on the bearer path from said inter-PLMN interworking entity towards said UE.

The detailed implementation of the above-mentioned configuration does not raise any special problem for a person skilled in the art, and therefore such means do not need to be more fully disclosed than has been made above, by their function, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for session transfer between access networks for a User Equipment (UE), said method comprising insertion in a signaling path of a Visited Service Centralization and Continuity Application Server (V-SCC-AS) anchoring said session in IMS, said method comprising:
a Proxy Call Session Control Function (P-CSCF) receiving an Invite message for an outgoing session from a UE roaming in a Visited Public Land Mobile Network (V-FLMN), wherein the P-CSCF comprises a first memory storing computer-readable instructions and at least one first processor configured to execute said computer-readable instructions;
said P-CSCF detecting that said UE is subject to insertion in a signaling path of a V-SCC-AS located in said V-PLMN, wherein the V-SCC-AS comprises a second memory storing computer-readable instructions and at least one second processor configured to execute said computer-readable instructions;
said P-CSCF forwarding said Invite message to said V-SCC-AS; and
said V-SCC-AS anchoring said session, and forwarding said Invite message to a Serving Call Session Control Function (S-CSCF) in a Home Public Land Mobile Network (H-PLMN) of said UE.

2. A method according to claim 1, comprising:
said P-CSCF adding said V-SCC-AS in a Route of said Invite message.

3. A method according to claim 1, comprising, at IMS registration for said UE:
said P-CSCF routing a REGISTER request from said UE to said V-SCC-AS.

4. A method according to claim 1, comprising, at IMS registration for said UE:
said P-CSCF adding said V-SCC-AS in a Route of a REGISTER request from said UE.

5. A method according to claim 1,
wherein said V-SCC AS allocates a Visited Session Transfer Number (V-STN) value, to be transferred to a Mobility Management Entity (MME)/Serving CPRS Support Node (SGSN).

6. A method according to claim 1, wherein said V-SCC-AS is dedicated to Single Radio Voice Call Continuity (SRVCC).

7. A method according to claim 1, comprising:
said P-CSCF determining at registration of said UE, that said UE is to be subject to said V-SCC-AS insertion.

8. A method according to claim 1, comprising:
said P-CSCF determining at IMS registration, that said UE is to be subject to said V-SCC-AS insertion, when following conditions are met: said P-CSCF is handling a mobile Single Radio Voice Call Continuity (SRVCC) capable UE, roaming conditions are detected by said P-CSCF, and local V-PLMN policies are satisfied.

9. A method according to claim 1, comprising:
upon reception a REGISTER request at IMS registration of said UE, said V-SCC-AS adding itself in a Path sent to said S-CSCF.

10. A Proxy Call Session Control Function (P-CSCF), comprising a memory storing computer-readable instructions, and at least one processor configured to execute said computer-readable instructions to cause said P-CSCF to:
receive an Invite message for an outgoing session from a User Equipment (UE) roaming in a Visited Public Land Mobile Network (V-PLMN);
detect that said UE is subject to insertion in a signaling path of a Visited Service Centralization and Continuity Application Server (V-SCC-AS) located in said V-PLMN; and
forward said Invite message to said V-SCC-AS.

11. A P-CSCF according to claim 10, wherein said at least one processor is configured to:
add said V-SCC-AS in a Route of said Invite message.

12. A P-CSCF according to claim 10, wherein said at least one processor is configured to, at IMS registration for said UE:
route a REGISTER request from said UE to said V-SCC-AS.

13. A P-CSCF according to claim 10, wherein said at least one processor is configured to, at IMS registration for said UE:
add said V-SCC-AS in a Route of a REGISTER request from said UE.

14. A P-CSCF according to claim 10, wherein said V-SCC-AS is dedicated to Single Radio Voice Call Continuity (SRVCC).

15. A P-CSCF according to claim 10, wherein said at least one processor is configured to determine at IMS registration, that said UE is to be subject to said V-SCC-AS insertion.

16. A P-CSCF according to claim 10, wherein said at least one processor is configured to determine at IMS registration, that said UE is to be subject to said V-SCC-AS insertion, when following conditions are met: said P-CSCF is handling a mobile Single Radio Voice Call Continuity (SRVCC) capable UE, roaming conditions are detected by said P-CSCF, and local V-PLMN policies are satisfied.

17. A Visited Service Centralization and Continuity Application Server (V-SCC-AS) comprising a memory storing computer-readable instructions, and at least one processor configured to execute said computer-readable instructions to cause said V-SCC-AS to:
- receive, by said V-SCC-AS in a Visited Public Land Mobile Network (V-PLMN) of a User Equipment (UE), an Invite message for an outgoing session from said UE roaming in said V-PLMN; and
- anchor said session, and forward said Invite message to a Serving Call Session Control Function (S-CSCF) in a Home Public Land Mobile Network (H-PLMN) of said UE.

18. A V-SCC-AS according to claim 17, wherein said at least one processor is configured to
- allocate a Visited Session Transfer Number (V-STN) value, to be transferred to a Mobility Management Entity (MME)/Serving GPRS Support Node (SGSN).

19. A V-SCC-AS according to claim 17, wherein said V-SCC-AS is dedicated to Single Radio Voice Call Continuity (SRVCCI).

20. A V-SCC-AS according to claim 17, wherein said at least one processor is configured to, upon reception a REGISTER request at IMS registration of said UE, adding the V-SCC-SC in a Path sent to said S-CSCF.

* * * * *